United States Patent
Khoury et al.

[11] Patent Number: 5,684,588
[45] Date of Patent: Nov. 4, 1997

[54] HOMODYNE AND HETRODYNE IMAGING IN A LIGHT SCATTERING MEDIUM

[75] Inventors: Jehad Khoury, Concord, N.H.; Philip Hemmer, Fitchburn, Mass.; Charles L. Woods, Stow, Mass.; Jonathan Kane, Somerville, Mass.

[73] Assignee: United States of America as represented by the Secretary of the Air Force, Washington, D.C.

[21] Appl. No.: 726,180

[22] Filed: Oct. 4, 1996

[51] Int. Cl.[6] .................................................. G01B 9/02
[52] U.S. Cl. ........................ 356/347; 356/349; 359/10; 359/22
[58] Field of Search .......................... 356/345, 347, 356/349, 357, 355; 359/1–5, 10, 11, 13, 22

[56] References Cited

U.S. PATENT DOCUMENTS

| | | |
|---|---|---|
| 3,735,036 | 5/1973 | Macouski .......................... 356/347 |
| 4,304,458 | 12/1981 | Huignard et al. ................. 356/347 |
| 4,860,253 | 8/1989 | Owechko et al. ................. 356/347 |
| 4,881,818 | 11/1989 | Bustamante et al. ............. 356/367 |
| 5,136,172 | 8/1992 | Nakata et al. .................... 250/572 |
| 5,270,853 | 12/1993 | Bashkansky et al. ............. 356/347 |
| 5,303,031 | 4/1994 | Khoury et al. .................... 356/345 |
| 5,361,131 | 11/1994 | Tekemori et al. ................. 356/355 |
| 5,438,439 | 8/1995 | Mok et al. ......................... 359/10 |

Primary Examiner—Frank G. Font
Assistant Examiner—Robert Kim
Attorney, Agent, or Firm—Robert L. Nathans

[57] ABSTRACT

Image derogating optical noise due to light scattering of an object under examination, embedded in, or positioned in front of a light scattering medium, is substantially reduced by employing a two-dimensional all optical phase sensitive holographic detector and vibrating the light scattering material at an ultra-sonic frequency to produce both signal sidebands and noise sidebands. Homodyne and hetrodyne techniques are used to filter out sidebands due to the light scattering noise and pass the desired signals, thereby to output a clear image of the object free of optical scatter noise. A smart pixel image converter light valve may be substituted for the photorefractive member.

12 Claims, 2 Drawing Sheets

HOMODYNE AND HETRODYNE IMAGING IN A LIGHT SCATTERING MEDIUM

BACKGROUND OF THE INVENTION

The present invention relates to the field of optical image processing using nonlinear optics.

Imaging through a light scattering medium or imaging an object within a scattering medium is one of the most challenging problems in optical signal processing, and has significant importance in tomography and image formation in biological tissues. One popular "first light" approach to solving this problem is based on the principle of the first arriving light, wherein a time gate is used to separate the information carrying light, or the first light, from the noisy light, namely the subsequent scattered light. In a specific implementation by Mantic and Duguay, a hologram was used as a time gating processor. See "Ultrahigh-speed photography of picosecond light pulses and echoes", Applied Optics, 10, pp. 2162–2170, (1971). Since then, different time gating techniques have been used for performing the time gating, involving electronic and real time holograms, Kerr and Raman cells, and spatial filtering techniques yielding improved signal-to-noise ratios. Unfortunately, these first light techniques require ultrafast pulses and sophisticated instrumentation for ultrafast imaging, thus making them expensive to implement.

BRIEF SUMMARY OF EMBODIMENTS OF THE INVENTION

In accordance with a presently preferred embodiment of the invention, a reference light beam is directed at a holographic storage member along with a signal beam passed through an optically noisy light scattering medium containing an object under examination, and the result is a hologram of the object which can be read-out to recover the object image. The light scattering medium is vibrated at an ultrasonic frequency to produce doppler shifted sidebands of the image of the object and of the noise, separated from one another in frequency space. The reference light beam is modulated at the center frequency of the image sideband to recover the signal representing the object substantially free of scatter noise. In the case of a stationary object in front of the light scattering medium, only the scattering medium is vibrated and since the resulting sideband has a center frequency higher than the the bandpass frequency of the holographic member, the optical noise is filtered out and only a clear image is recovered.

BRIEF DESCRIPTION OF THE DRAWINGS

Other features and advantages of the present invention will become apparent upon study of the following description, taken in conjunction with the figures in which.

DETAILED DESCRIPTION OF PREFERRED EMBODIMENTS OF THE INVENTION

Figure 1:
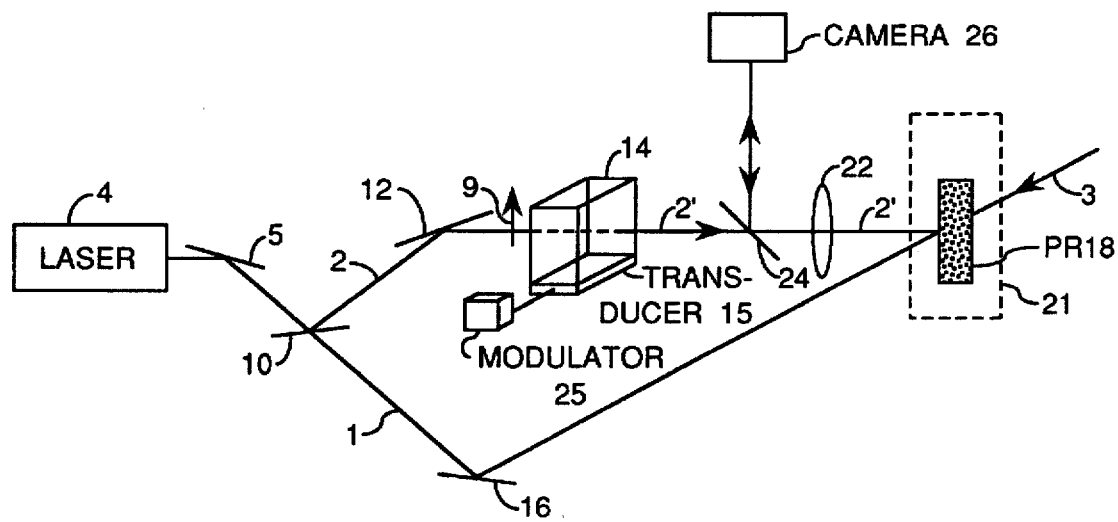
FIG. 1 illustrates a first embodiment of the invention for retrieving a clear image of an object positioned in front of the light scattering material.

In FIG. 1, a laser diode 4 produces a signal beam 2 which is directed through light scattering medium 14, having object 9 associated therewith, via mirror 5, beam splitter 10 and mirror 12. The resulting object signal beam 2' emerging from the medium is directed at photorefractive crystal 18 via beam splitter 24, and an imaging lens 22, which images the object 9, positioned in front of light scattering medium 14, within crystal 18. Medium 14 could be a light scattering pathway within an optical system through which an image of object 9 is being conveyed. Photorefractive crystal 18, eg. of barium titanate, is one type of real-time holographic storage medium which can be used in carrying out the present invention.

Reference beam 1, emerging from beam splitter 10, is also directed at the photorefractive crystal 18, via mirror 16. Reference beam 1 interferes with the object signal beam 2' carrying the image of the object 9, focussed within the crystal 18 by lens 22, to form a hologram therein. A path length adjusting prism, not shown, may be provided to adjust the path length of the reference beam relative to the path length of the object signal beam, and when properly adjusted, an image of object 9, produced within crystal 18, is read out of the crystal by read-out beam 3, coherent with beams 1 and 2, and a clear image of the object is projected at camera 26, which records the clear image of the object 9.

Accordingly, in the absence of light scattering medium 14, the reference and signal beams, in phase with one another, are directed at the photorefractive crystal 18 by beams 1 and 2, and the resulting hologram within the crystal is read out by read-out beam 3, and a reconstruction of the object 9, in front of light scattering medium 14, would be recorded by camera 26, optically coupled to the crystal via beam splitter 24 and focusing lens 22. The photorefractive crystal 18 and the beams passed therethrough, constitute an all optical, two dimensional phase sensitive detector 21, fully described in U.S. Pat. No. 5,303,031 to Khoury et al., and incorporated by reference herein. In accordance with the functioning of phase sensitive detector of the patent, if the reference beam, directed at a photorefractive crystal, is modulated by a modulation frequency substantially equal to the modulation frequency of the signal beam carrying the object image, and these beams remain in phase with one another, a stationary real time hologram will be produced in the photorefractive crystal and can be read-out and the object represented by the hologram can be captured by a camera. However, if this in phase wavefront phase relationship is not maintained, destructive interference will occur, and read-out of a clear image of the object from the crystal would no longer occur.

In accordance with the FIG. 1 embodiment of the invention, an electrical to ultrasonic vibration transducer 15 is provided, and constitutes a vibrator means for vibrating the light scattering medium 14 at a frequency to produce a doppler shifted sideband having a center frequency higher than the bandpass frequency of the holographic storage member 18. Putting it another way, the photorefractive crystal 18 has a response time which is less than the reciprocal of the center frequency of the doppler shift.

Figure 2:
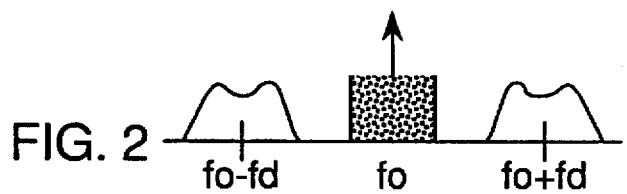
FIGS. 2 and 4 illustrate the sidebands produced by the aforesaid droppler shifts of the embodiments of FIGS. 1 and 3 respectively.

As indicated by a representation of the frequency space in FIG. 2, the bandpass fo of the holographic storage medium 18 is shown between the upper and lower sidebands produced by vibration of the scattering medium by the vibration means comprising ultra-sonic transducer 15 and modulator 25 for driving the transducer. Drive frequencies of modulator 25 in the range of 1-100 megahertz produced good results. Thus, the FIG. 1 arrangement acts as a filter to filter out the scatter noise spectra fo+fd of FIG. 2, and pass the object information at fo. The same effect could be realized by using a CCD camera and averaging over many frames.

In contrast with the embodiment of the invention of FIGS. 1 and 2, FIGS. 3 and 4 illustrate a second embodiment wherein object 9 is embedded within the light scattering medium 14. For example, object 9 could constitute a tumor section to be examined by a pathologist, such tumor being positioned within a tissue section of a patient. Since much of the apparatus is the same as in FIG. 1, the same numbers have been assigned to the same components described above. Thus, ultra-sonic transducer 15 is provided to act as a vibrator as in the FIG. 1 embodiment.

Figure 4:
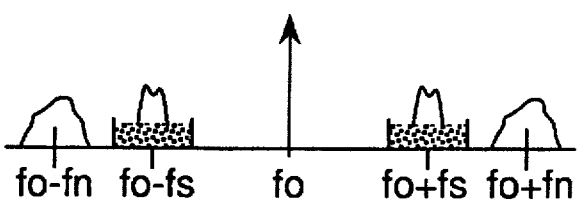
Figure 5:
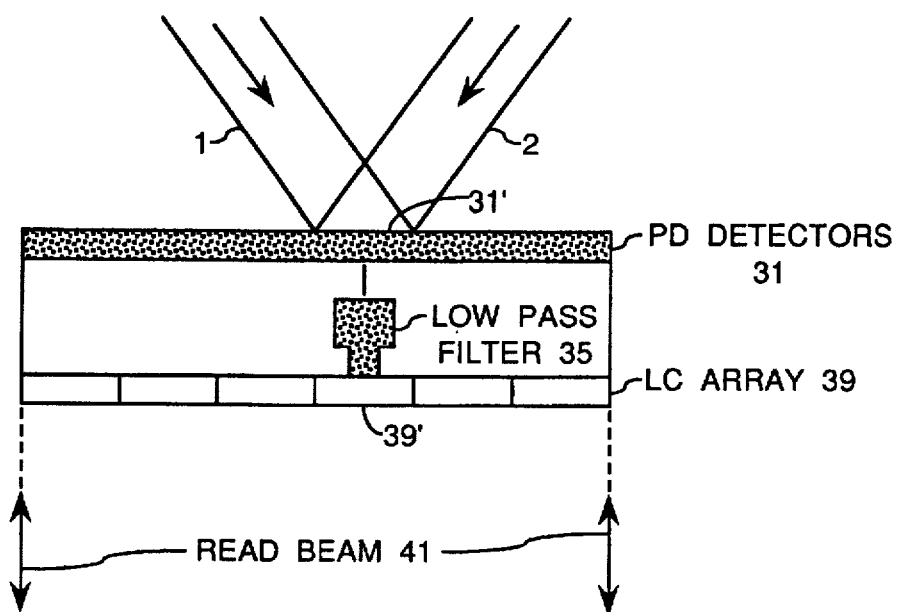
FIG. 5 illustrates a first liquid crystal light valve embodiment of the invention.
Figure 6:
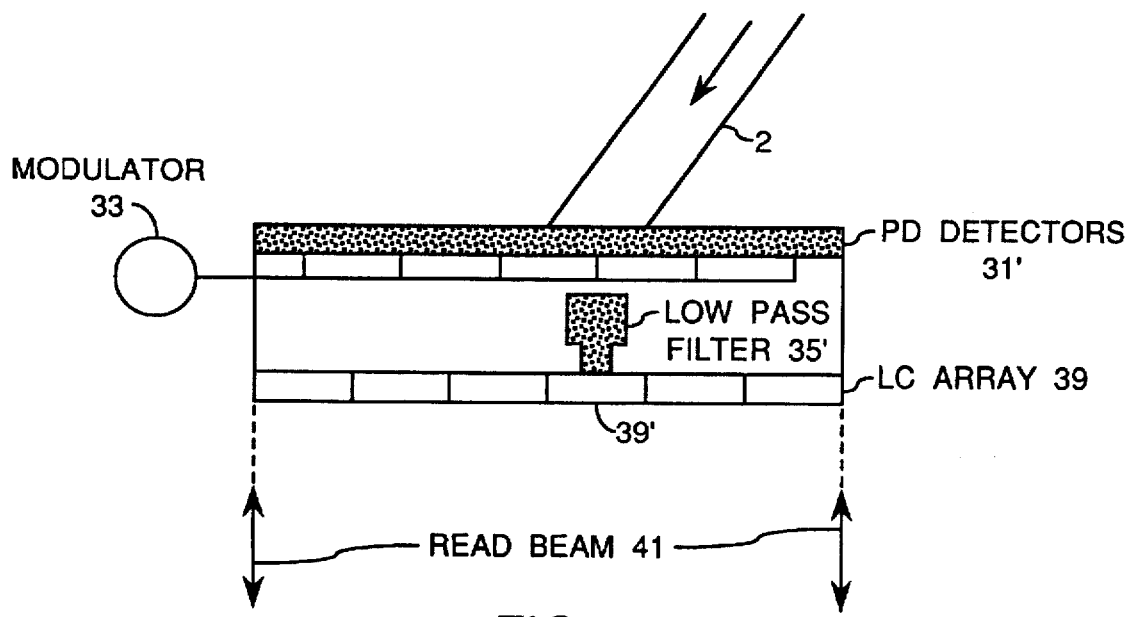
FIG. 6 illustrates a second liquid crystal light valve embodiment of the invention.

We have observed that the different textures of the object tumor and of the scattering tissue medium produce different droppler shifts upon being subjected to vibration by transducer 15. Such texture differences are commonplace for other contrasting media 9 and 14. These different doppler shifts are separated by beating the signal beam 2' with the reference beam 1 that is modulated at the correct frequency by the provision of an electro-optic modulator 27. As indicated by fo+fs in FIG. 4, the light transmitted through the object is droppler shifted in frequency space by amounts within a bandpass fo+fs related to the statistical distribution of the spatial frequencies of the object, eg. the tumor. The scatter noise producing medium includes irregularities that have a different spatial frequency distributions and thus a different effect on the light, namely inducing different droppler shifts, and thus produces shifts within a bandpass fo+fn, which differs in frequency space relative to the shifts produced by the object, and are thus separated as shown in FIG. 4. The reference beam 1 is modulated by electro-optic modulator 27, such that the reference beam is equivalent to and thus in the neighborhood of the signal doppler frequency, and the desired object information, in contrast with the noise, is accordingly band-passed by the holographic medium to be outputted to camera 26 via lens 22.

Figure 3:
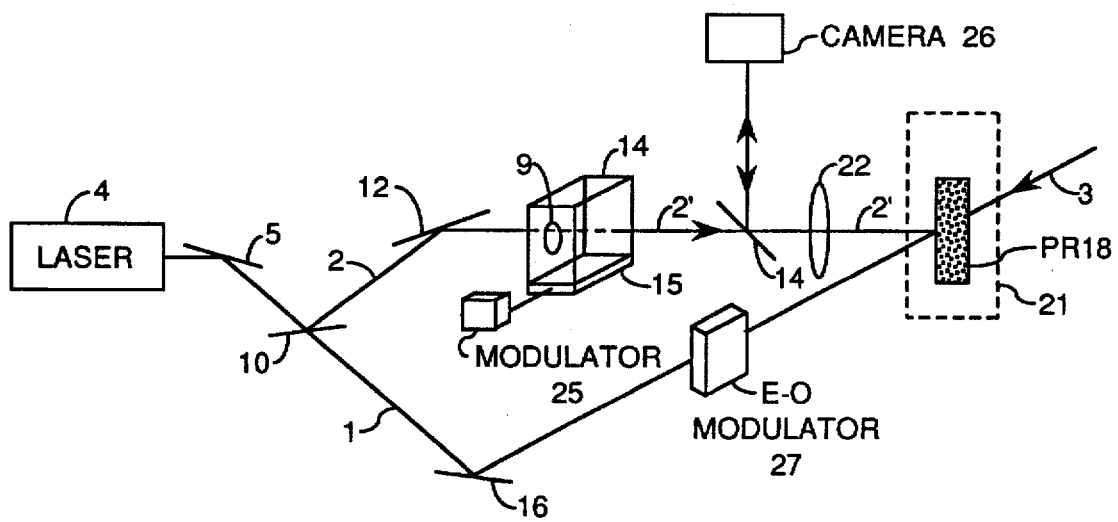
FIG. 3 illustrates a second embodiment of the invention for retrieving a clear image of the object positioned within the light scattering medium.

Hence, in accordance with the embodiment of FIG. 3, the optical characteristics of the real-time holographic medium 18 filters out the scatter noise spectra of medium 14 while simultaneously allowing the image of the object 9 to be amplified. Typically, the frequency range of modulation of the reference beam 1 by modulator 27 would extend up to several hundred megahertz.

Regarding real-time holographic storage medium 18, our preference is to employ high gain, low noise nonlinear materials such as ferroelectric photorefractive materials, eg. barium titanate with Rh doping in a self-bending geometry. This material has the largest coupling coefficient observed by us so far, and works in the wavelength range of primary interest for examining biological tissues. Other materials such as thin film polymers can be used with multi-stage amplification, because one thin film is not enough. Resonant systems such as atomic vapors, can also be used where high speed response at low light levels are required. In all of these geometries, we can use a diverging pump beam to ensure high resolution gain.

The real-time holographic storage medium can be replaced with an electro-optic device such as a smart pixel spatial light modulator. Such a device is described in a copending Jonathan Kane U.S. Pat. application Ser. No. 08/594,358 filed Oct. 27, 1995. A modified form of this device is illustrated in FIG. 2, and includes a pixel photodetector array 31, each detector thereof receiving a portion of the aforesaid reference beam 1 and a portion of distorted object beam 2 within the field. Each detector 31'is coupled to an associated liquid crystal pixel light modulator element 39'via a low pass filter element 35 of an array of such elements of the smart pixel device. The two incoming optical beams 1 and 2 are made to be coincident on the same detectors, each of which produces a current proportional to the interference or beat signal between the two incoming light waves. These two signals are brought into electronic low pass filter 35 and the resulting output voltage is then used to drive an associated liquid crystal (LC) light modulation element 39'of LC element array 39. Thus, this output voltage is used to drive the LC modulator pad elements 39'which affect the state of polarization of the readout beam 41 passed through the LC crystal output array to display the output, as is conventional for image convertor light valves. The output can be read off of either the front or back side of the spatial light modulator light valve via an external read beam 41. This apparatus may also be described as a light valve image convertor, well known in this art, and modified by the filter elements as described. See for example, "Liquid Crystal Light Valve", Jan Grinberg et al., Optical Engineering, Vol. 14, No. 3(1975). Hence, the aforesaid low pass filter function is performed electrically in this embodiment of the invention.

In accordance with the embodiment of FIG. 3, the reference wave 1 is eliminated and modulator 33 provides the reference modulation signal electronically so that each detector signal of detector array 31'would be modulated at the same phase and amplitude as the reference laser beam 1. Each resultant beat signal is passed through low pass filter element 35 to an associated LC display element of modulator array 39, which is read out by beam 41 as described above.

Since variations in the foregoing will readily occur to skilled workers in the art, the scope of the invention is to be limited solely by the terms of the following claims and art recognized equivalents thereto.

What is claimed is:

1. Apparatus for retrieving an image of an object positioned in front of a light scattering medium comprising:
   (a) a real-time holographic storage member;
   (b) a beam source for generating a coherent reference light beam and for directing said reference light beam at said holographic storage member;
   (c) light directing means for passing a signal beam coherent with respect to said reference light beam through said object and through said light scattering medium in front of said object to produce a signal light beam emerging therefrom and directed at said holographic storage medium;
   (d) vibrator means for vibrating said light scattering medium at a frequency to produce a doppler shifted sideband having a center frequency higher than the bandpass frequency of said holographic storage member; and
   (e) read-out means for reading out said hologram from said holographic storage member for retrieving an image of said object substantially free of scatter noise.

2. The apparatus of claim 1 wherein said vibrator means is an ultrasonic transducer.

3. The apparatus of claim 1 wherein said holographic storage member comprises a photorefractive crystal and wherein said readout means includes means for directing a read-out light beam at said photorefractive crystal coherent with said reference light beam.

4. The apparatus of claim 2 wherein said holographic storage member comprises a photorefractive crystal and wherein said readout means includes means for directing a read-out light beam at said photorefractive crystal coherent with said reference light beam.

5. Apparatus for retrieving an image of an object positioned within a light scattering medium comprising:

(a) a real-time holographic storage member;

(b) a beam source for generating a coherent reference light beam and directing said reference light beam at said holographic storage member;

(c) light directing means for passing said coherent reference light beam through said object within said light scattering medium to produce a signal light beam emerging therefrom and directed at said holographic storage medium;

(d) vibration means for vibrating said light scattering medium, along with said object therein, at a frequency to produce a doppler shifted sideband having a given center frequency;

(e) modulation means for modulating said reference beam at said center frequency of the droppler shifted signal sideband; and (f) read-out means for reading out said hologram from said holographic storage member for retrieving an image of said object substantially free of scatter noise which would otherwise be produced by said scattering medium.

6. The apparatus of claim 5 wherein said vibration means is an ultrasonic transducer.

7. The apparatus of claim 5 wherein said holographic storage member comprises a photorefractive crystal and wherein said readout means includes means for directing a read-out light beam at said photorefractive crystal coherent with said reference light beam.

8. The apparatus of claim 6 wherein said holographic storage member comprises a photorefractive crystal and wherein said readout means includes means for directing a read-out light beam at said photorefractive crystal coherent with said reference light beam.

9. Apparatus for retrieving an image of an object positioned in front of a light scattering medium comprising:

(a) a light valve image converter including a two-dimensional photodetector input array, a two-dimensional liquid crystal light modulating output array, and an array of low pass electrical filter elements coupled therebetween;

(b) a beam source for generating a coherent reference light beam and for directing said reference light beam at said photodetector input array;

(c) light directing means for passing a signal beam coherent with respect to said reference light beam through said object and through said light scattering medium in front of said object to produce a signal light beam emerging therefrom and directed at said photodetector input array;

(d) vibrator means for vibrating said light scattering medium at a frequency to produce a doppler shifted sideband having a center frequency higher than the bandpass frequency of said low pass electrical filter elements; and (e) read-out means for reading out said liquid crystal light modulating output array for retrieving an image of said object embedded within said light scattering medium substantially free of scatter noise.

10. The apparatus of claim 9 wherein said vibrator means is an ultrasonic transducer.

11. Apparatus for retrieving an image of an object positioned within a light scattering medium comprising:

(a) a light valve image converter including a two-dimensional photodetector input array, a two-dimensional liquid crystal light modulating output array, and an array of low pass electrical filter elements coupled therebetween;

(b) a beam source for generating a coherent reference light beam and directing said reference light beam at said photodetector input array;

(c) light directing means for passing said coherent reference light beam through said object within said light scattering medium to produce a signal light beam emerging therefrom and directed at said photodetector input array;

(d) vibration means for vibrating said light scattering medium, along with said object therein, at a frequency to produce a doppler shifted sideband having a given center frequency;

(e) modulation means for modulating said reference beam at said center frequency of the doppler shifted signal sideband; and (f) read-out means for reading out said liquid crystal light modulating output array for retrieving an image of said object embedded within said light scattering medium substantially free of scatter noise.

12. The apparatus of claim 11 wherein said vibration means is an ultrasonic transducer.

* * * * *